(12) United States Patent
Mukai et al.

(10) Patent No.: US 7,437,298 B2
(45) Date of Patent: Oct. 14, 2008

(54) METHOD AND APPARATUS FOR MOBILE PHONE USING SEMICONDUCTOR DEVICE CAPABLE OF INTER-PROCESSING VOICE SIGNAL AND AUDIO SIGNAL

(75) Inventors: Takuo Mukai, Osaka (JP); Yukihiro Imai, Hyogo (JP)

(73) Assignee: Ricoh Company, Ltd., Tokyo (JP)

( * ) Notice: Subject to any disclaimer, the term of this patent is extended or adjusted under 35 U.S.C. 154(b) by 883 days.

(21) Appl. No.: 10/802,318

(22) Filed: Mar. 16, 2004

(65) Prior Publication Data

US 2004/0192192 A1 Sep. 30, 2004

(30) Foreign Application Priority Data

Mar. 31, 2003 (JP) ............................. 2003-095485

(51) Int. Cl.
*G10L 21/00* (2006.01)
(52) U.S. Cl. .................. 704/278; 704/207; 704/270; 341/61
(58) Field of Classification Search .............. 704/207, 704/270, 278; 341/61
See application file for complete search history.

(56) References Cited

U.S. PATENT DOCUMENTS

| | | | |
|---|---|---|---|
| 5,216,516 A | | 6/1993 | Tanaka et al. |
| 5,337,069 A | | 8/1994 | Otake et al. |
| 5,337,168 A | | 8/1994 | Fujii et al. |
| 5,349,610 A | | 9/1994 | Sakamoto et al. |
| 5,495,266 A | | 2/1996 | Otake et al. |
| 5,638,135 A | | 6/1997 | Mukai |
| 5,774,567 A | * | 6/1998 | Heyl ........................... 381/119 |
| 5,841,387 A | * | 11/1998 | VanBuskirk ................. 341/155 |
| 6,052,156 A | | 4/2000 | Mukai et al. |
| 6,088,461 A | * | 7/2000 | Lin et al. ..................... 381/104 |
| 6,125,288 A | | 9/2000 | Imai |
| 6,154,161 A | * | 11/2000 | Leme et al. .................. 341/143 |
| 6,255,577 B1 | | 7/2001 | Imai |
| 6,411,225 B1 | * | 6/2002 | Van Den Enden et al. ...... 341/61 |
| 6,608,572 B1 | * | 8/2003 | Venkitachalam et al. ....... 341/61 |
| 6,683,927 B1 | * | 1/2004 | Ito ............................. 375/355 |

(Continued)

FOREIGN PATENT DOCUMENTS

JP        10/513628        12/1998

(Continued)

*Primary Examiner*—Richmond Dorvil
*Assistant Examiner*—Qi Han
(74) *Attorney, Agent, or Firm*—Cooper & Dunham, LLP (57) ABSTRACT

A method and apparatus of mobile phone using a semiconductor device includes a first converter, a second converter, a first digital processing circuit, and a second digital processing circuit. The first converter converts a first digital audio signal sampled with a predetermined audio sampling frequency into a second digital audio signal sampled with a predetermined voice sampling frequency. The second converter converts a first digital voice signal sampled with the predetermined voice sampling frequency into a second digital voice signal sampled with the predetermined audio sampling frequency. The first digital processing circuit performs a predetermined digital computation on the second digital audio signal sampled with the predetermined voice sampling frequency and a third digital voice signal. The second digital processing circuit performs the predetermined digital computation on the second digital voice signal sampled with the predetermined audio sampling frequency and the first digital audio signal sampled with the predetermined audio sampling frequency.

51 Claims, 4 Drawing Sheets

U.S. PATENT DOCUMENTS 7,120,584 B2 * 10/2006 Sheikhzadeh-Nadjar et al. . 704/266

FOREIGN PATENT DOCUMENTS

| JP | 2000-299718 | 10/2000 |
| JP | 2003-352999 | 12/2000 |
| JP | 2001-256730 | 9/2001 |
| JP | 2002-247156 | 8/2002 |

* cited by examiner

| Fs1 \ Fs2 | 32kHz | 44.1kHz | 48kHz |
|---|---|---|---|
| 8kHz | 8 → 32 (12)<br>32 → 8 (11) | 8 → 44.1 (12)<br>44.1 → 8 (11) | 8 → 48 (12)<br>48 → 8 (11) |
| 16kHz | 16 → 32 (12)<br>32 → 16 (11) | 16 → 44.1 (12)<br>44.1 → 16 (11) | 16 → 48 (12)<br>48 → 16 (11) |

FIG. 4

METHOD AND APPARATUS FOR MOBILE PHONE USING SEMICONDUCTOR DEVICE CAPABLE OF INTER-PROCESSING VOICE SIGNAL AND AUDIO SIGNAL

BACKGROUND

1. Field

This patent specification generally relates to a method and apparatus for a mobile phone, and, in particular, to a method and apparatus for a mobile phone capable of reproducing and/or recording audio using a semiconductor device which performs inter-processing of digital audio and voice signals to increase the quality thereof.

2. Discussion of the Background

The increase in packing density of large-scale integration (LSI) in recent years has promoted tighter packing of functions used in a mobile phone. Multi-functional mobile phones thus are now becoming common and are capable of working as a telephone and music player, or as a telephone, a music player, and a movie and music recorder at the same time, for example. Such a mobile phone uses an installed LSI component or a discrete component, as necessary, to mix a voice signal with an audio signal. The voice signal is input from an input device, such as a microphone, or received from another telephone and demodulated, while the audio signal is reproduced in the mobile phone. A signal mixed in such a manner is transmitted to an output device such as a speaker or a headphone.

Figure 1:
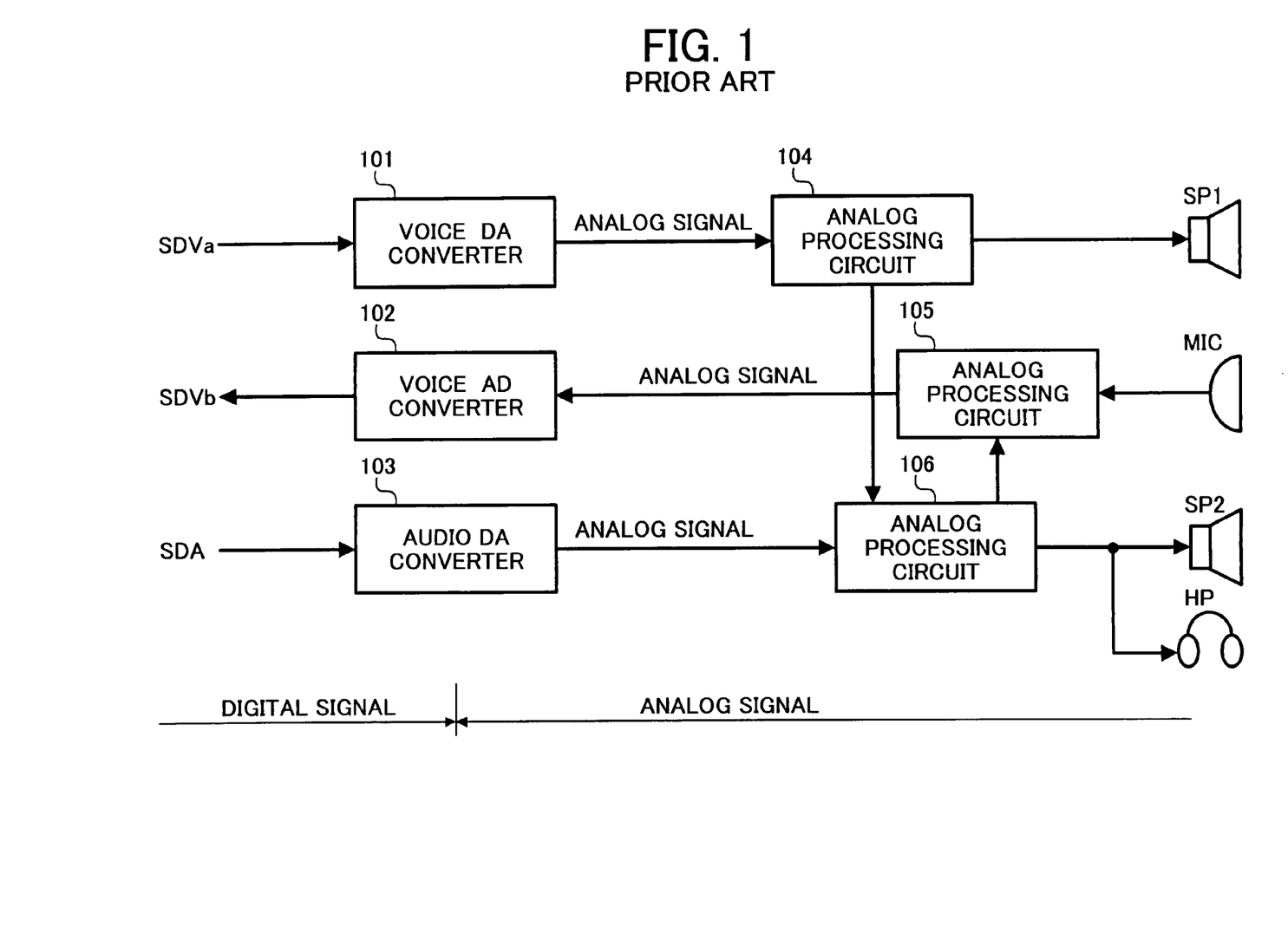
FIG. 1 is a block diagram showing a unit of sound processing used in a conventional mobile phone.

FIG. 1 is a block diagram showing an exemplary unit for sound processing used in a conventional mobile phone, as described in Japanese Laid-Open Patent Application Publication No. 2000-299718, for example.

In FIG. 1, a received and demodulated digital voice signal SDVa is converted into an analog signal with a voice digital-to-analog (DA) converter 101, processed with a volume adjustment and so forth in an analog processing circuit 104, and output from a voice output device, such as a first speaker SP1. A reproduced audio signal SDA is converted into an analog signal with an audio DA converter 103. An analog processing circuit 106 performs on the converted audio signal SDA an addition or subtraction with the analog voice signal, or a volume adjusting. The processed audio signal SDA processed is then output from an audio output device such as a second speaker SP2 or a headphone HP.

An analog voice signal from a voice input device, such as a microphone MIC, on the other hand, is processed with an analog processing circuit 105 which performs a volume adjustment, an,addition/subtraction with the analog audio signal, or the like. The processed analog voice signal is further converted into a digital voice signal SDVb with an audio analog-to-digital (AD) converter, and transmitted to a processing block for a modulation and transmission. It is to be noted that a signal path of a mixed signal of voice and audio shown in FIG. 1 is one possible example. There may be various signal paths for the mixed signal, depending on a type of the mobile phones.

A conventional technique, however, experiences problems such as deterioration in quality of an analog signal or generation of auditory noise due to high-frequency noise in a mobile phone, caused by analog signal processing, that is, an addition/subtraction or a volume adjustment using an operational amplifier.

It is also desirable to provide a mobile phone using a semiconductor device which is capable of mounting a digital class-D amplifier in place of a class-AB amplifier, thereby increasing electric power efficiency.

SUMMARY

This patent specification describes a novel semiconductor device used in a mobile phone that processes digital signals. In one example, a novel semiconductor device includes a first converter, a second converter, a first digital processing circuit, and a second digital processing circuit. The first converter converts a digital audio signal sampled with a predetermined audio sampling frequency for a digital audio signal into a digital audio signal sampled with a predetermined voice sampling frequency for a voice signal. The second converter converts a digital voice signal sampled with the predetermined voice sampling frequency into a digital voice signal sampled with the predetermined audio sampling frequency. The first digital processing circuit performs a predetermined digital computation on the digital audio signal sampled with the predetermined voice sampling frequency and a digital voice signal. The second digital processing circuit configured to perform the predetermined digital computation on the digital voice signal sampled with the predetermined audio sampling frequency and the digital audio signal sampled with the predetermined audio sampling frequency.

The predetermined digital computation may be configured to include an addition, a subtraction, a rate setting of the addition, and a rate setting of the subtraction.

The first digital processing circuit may be configured to perform a volume setting on a digital signal processed with the predetermined digital computation.

The first digital processing circuit may be configured to perform a signal band restriction on a digital signal processed with the predetermined digital computation.

The signal band restriction may be configured to be pre-programmable.

The second digital processing circuit may be configured to perform a volume setting on a digital signal processed with the predetermined digital computation.

The second digital processing circuit may be configured to perform a signal band restriction on a digital signal processed with the predetermined digital computation.

The signal band restriction may be configured to be pre-programmable.

In another example, a mobile phone using a semiconductor device includes an input device, a voice AD converter, a voice DA converter, an output device, an audio DA converter, and an audio output device. The input device converts a voice into an analog voice signal and outputs the analog voice signal. The voice AD converts the analog voice signal output from the input device into a digital signal and outputs the digital signal as a first digital voice signal.

The voice DA converter converts a second digital voice signal sampled with a predetermined voice sampling frequency for a voice signal into an analog voice signal. The voice output device generates a voice sound in accordance with the analog voice signal output from the voice digital-to-analog converter. The audio DA converter converts a digital audio signal sampled with a predetermined audio sampling frequency for an audio signal into an analog audio signal. The audio output device generates an audio sound in accordance with the analog audio signal output from the audio DA converter. The semiconductor device processes and outputs the first digital voice signal, the second digital voice signal sampled with the predetermined voice sampling frequency, and the digital audio signal sampled with the predetermined audio sampling frequency. The semiconductor device includes a first converter, a second converter, a first digital processing circuit, and a second digital processing circuit.

In another example, a mobile phone using a semiconductor device includes an input device, a voice AD converter, a digital voice amplifier, a voice output device, an audio digital amplifier, and an audio output device.

The input device converts a voice into an analog voice signal. The voice AD converter converts the analog voice signal output from the input device into a first digital voice signal. The digital voice amplifier amplifies and output a second digital voice signal sampled with a predetermined voice sampling frequency for a voice signal. The voice output device generates a voice sound in accordance with the second digital voice signal output from the digital voice amplifier. The digital audio amplifier amplifies and outputs a digital audio signal sampled with a predetermined audio sampling frequency for an audio signal. The audio output device generates an audio sound in accordance with the digital audio signal output from the digital audio amplifier.

The semiconductor device processes and outputs the first digital voice signal, the second digital voice signal sampled with the predetermined voice sampling frequency, and the digital audio signal sampled with the predetermined audio sampling frequency.

This patent specification further describes another novel method of providing a semiconductor device. In one example, the novel method includes the steps of first converting, second converting, first digital processing, and second digital processing. The first converting step converts a first digital audio signal sampled with a predetermined audio sampling frequency for digital audio into a second digital audio signal sampled with a predetermined voice sampling frequency for voice signals. The second converting step converts a first digital voice signal sampled with the predetermined voice sampling frequency into a second digital voice signal sampled with the predetermined audio sampling frequency. The first digital processing processes the second digital audio signal sampled with the predetermined voice sampling frequency and a third digital voice signal with a predetermined digital computation. The second digital processing processes the second digital voice signal sampled with the predetermined audio sampling frequency and the first digital audio signal sampled with the predetermined audio sampling frequency with the predetermined digital computation.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF PREFERRED EMBODIMENTS

Figure 2:
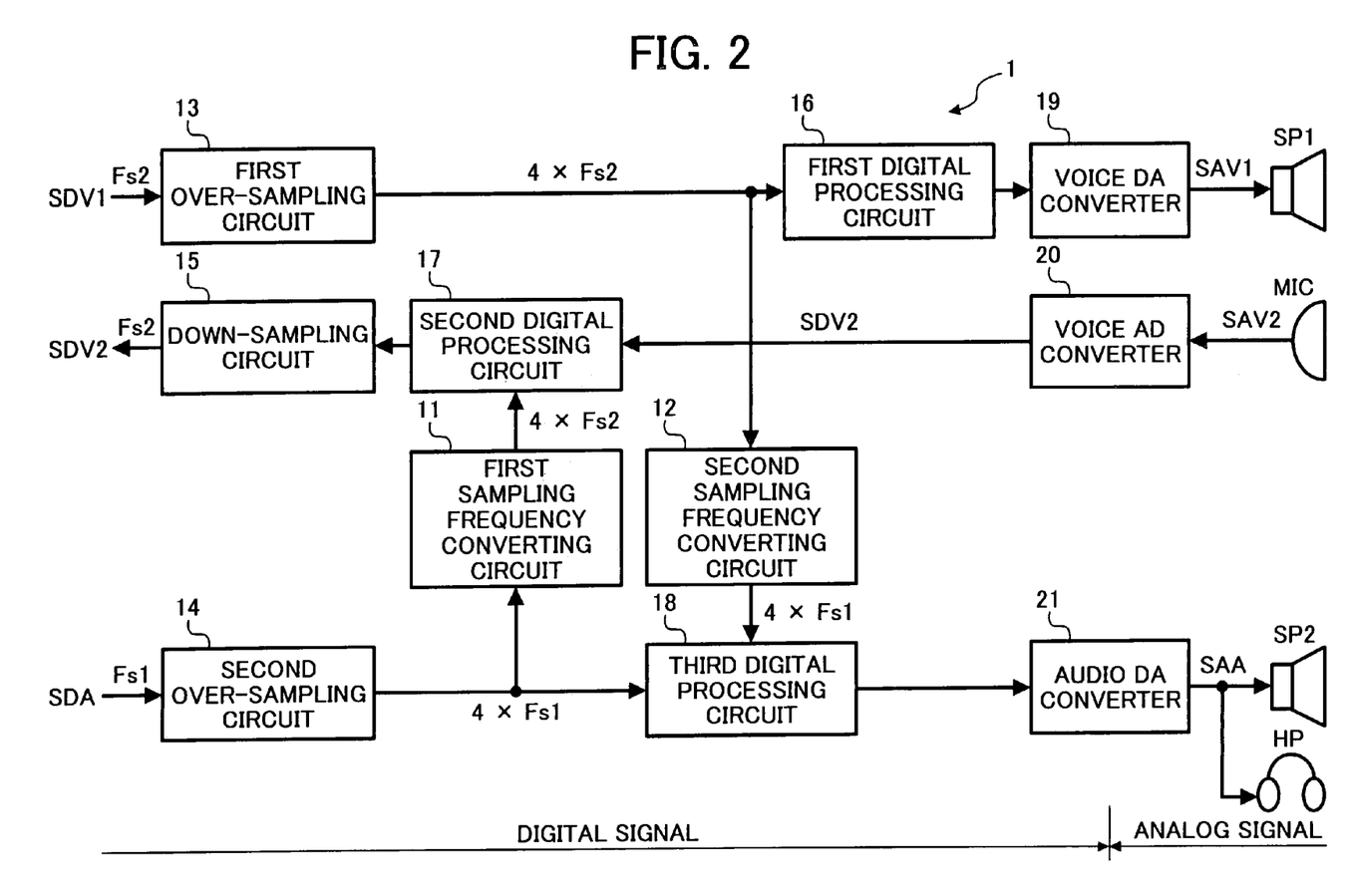
FIG. 2 is a block diagram showing a semiconductor device according to an exemplary embodiment of the present specification.

In describing preferred embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner. Referring now to the drawings, wherein like reference numerals designate identical or corresponding parts throughout the several views, particularly to FIG. 2, an audio device 1 according to an exemplary embodiment of the present specification is described. FIG. 2 shows an exemplary configuration of a semiconductor device used in the audio device 1 installed in a mobile phone, for example. Portions performing voice sending/receiving and audio reproducing are omitted in the figure.

In FIG. 2, the audio device 1 is provided with a first sampling frequency converting circuit 11, a second sampling frequency converting circuit 12, a first over-sampling circuit 13, a second over-sampling circuit 14, and a down-sampling circuit 15. The audio device 1 is also provided with a first digital processing circuit 16, a second digital processing circuit 17, a third digital processing circuit 18, a voice DA converter 19, a voice AD converter 20, an audio DA converter 21, a first speaker SP1, a second speaker SP2, a microphone MIC, and a headphone HP. The first speaker SP1 outputs a voice sound while the second speaker SP2 outputs an audio sound. The microphone MIC works to input a voice sound. The first speaker SP1 and the microphone MIC form a receiver of the mobile phone.

FIG. 2 also includes a first digital voice signal SDV1, a second digital voice signal SDV2, a digital audio signal SDA, a first analog voice signal SAV1, a second analog voice signal SAV2, an analog audio signal SAA, a first sampling frequency Fs1, and a second sampling frequency Fs2. A digital voice signal SDV will be used for referring to either of the first digital voice signal SDV1 and the second digital voice signal SDV2.

A configuration is possible that integrates the following components onto one integrated circuit (IC). The first sampling frequency converting circuit 11, the second sampling frequency converting circuit 12, the first over-sampling processing circuit 13, the second over-sampling processing circuit 14, the first digital processing circuit 16, the second digital processing circuit 17, the third digital processing circuit 18, the voice DA converter 19, the voice AD converter 20, and the audio DA converter 21.

The second sampling frequency Fs2 applied to the digital voice signal SDV normally adopts a frequency of 8 kHz or 16 kHz. As for the first sampling frequency Fs1 for the digital music signal SDA, a frequency of 32 kHz, 44.1 kHz, or 48 kHz is normally adopted. Since an analog signal is a sequential signal, it is capable of being directly processed in an addition or subtraction. An idea of sampling is thus inapplicable to the analog signal. In contrast, as a digital signal is a sampled discrete time signal, it is unable to be added or subtracted with other digital signals sampled with different sampling frequencies.

To solve the above problem, the first sampling frequency converting circuit 11 converts the digital audio signal SDA sampled with the first sampling frequency Fs1 into a signal sampled with the second sampling frequency Fs2 used for the digital voice signal SDV. The second sampling frequency converting circuit 12 converts, in reverse, the digital voice signal SDV1 sampled with the second sampling frequency Fs2 into a signal sampled with the first sampling frequency Fs1 used for the digital audio signal SDA.

The above process makes the sampling frequencies in digital signals identical, thereby enabling the addition and subtraction of the digital voice signal SDV and the digital audio signal SDA to and from each other.

Figure 3:
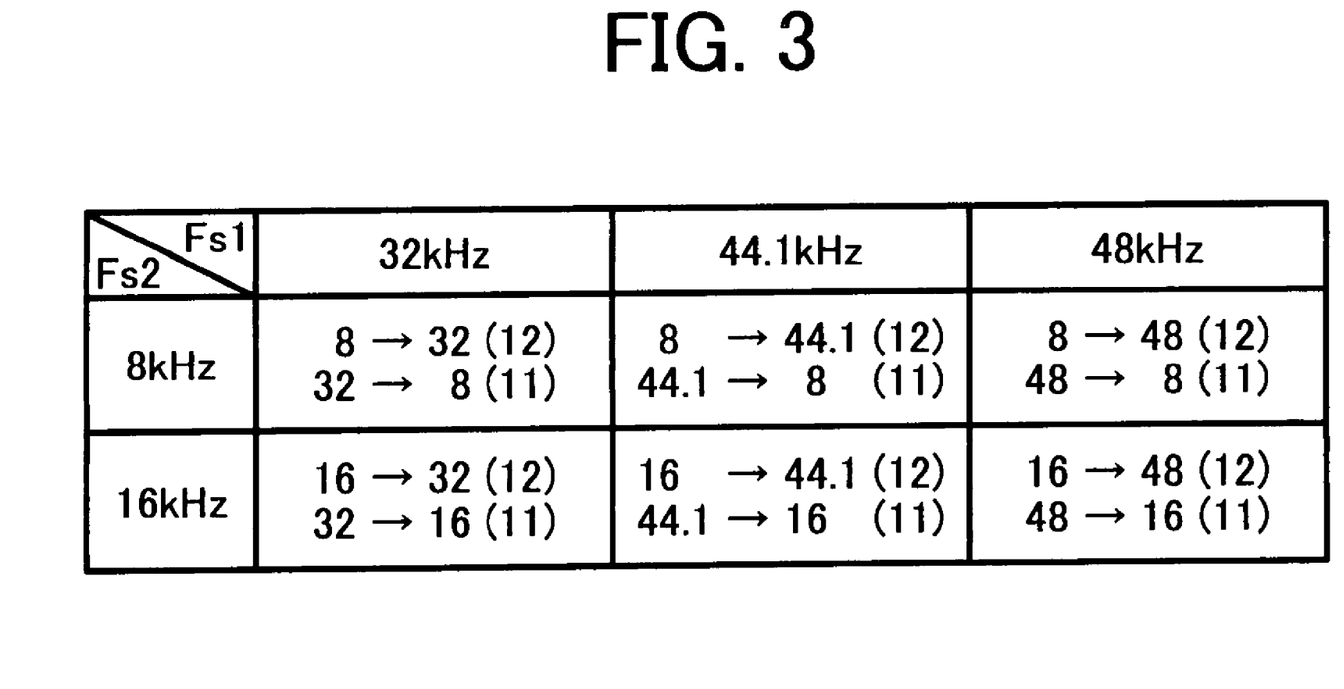
FIG. 3 is a table listing combinations of sampling frequencies used in converting sampling frequencies.

In this case, the first and second sampling frequencies Fs1 and Fs2 make twelve combinations of possible sampling frequency conversions, as shown in FIG. 3. The voice digital signal SDV and the audio digital signal SDA are converted with corresponding sampling frequencies selected each time according to conditions. In one exemplary case, an 8 kHz to 44.1 kHz conversion is applied to the digital voice signal SDV, while a 44.1 kHz to 8 kHz conversion is applied to the digital audio signal SDA. A technique of a circuit processing a sampling frequency conversion is publicly known, as described in "Interpolation and Decimation of Digital Signal-A tutorial Review" Lawrence R. Rabiner, Proceeding of The IEEE, vol.69, No.3 March 1981, for example.

As the DA and AD converters in the audio device 1, a delta-sigma typed DA converter and AD converter may be adopted. The delta-sigma typed DA converter and AD converter respectively require an over-sampling and down-sampling operations in digital processing. The first over-sampling circuit 13 and the second over-sampling circuit 14 perform the over-sampling operation, and the down-sampling circuit 15 performs down-sampling operation. These sampling operations are required in the delta-sigma typed converters, as well as serving as a part of the over-sampling and down-sampling operations required in the sampling frequency conversion. For example, the first sampling frequency converting circuit 11 converts a sampling frequency from 4×Fs1 into 4×Fs2, while the second sampling frequency converting circuit 12 converts another sampling frequency of 4×Fs2 into 4×Fs1. The sampling frequency conversion in this example is a process for converting a multiplication of an original sampling frequency into a multiplication of a target sampling frequency.

In FIG. 2, the received and demodulated digital voice signal SDV1 is sampled with the second sampling frequency Fs2. The digital voice signal SDV1 is over-sampled in the first over-sampling circuit 13 with the frequency of 4×Fs2, i.e., four-times multiplication of the second sampling frequency Fs2. The sampled digital voice signal SDV1 is further transmitted separately to the first digital processing circuit 16 and the second sampling frequency converting circuit 12. The first digital processing circuit 16 processes the digital voice signal SDV1 with a volume adjustment, a signal band limitation, or the like. The processed digital voice signal SDV1 is converted into the analog voice signal SAV1 with the voice DA converter 19, and output from the first speaker SP1. The second sampling frequency converting circuit 12 converts the digital voice signal SDV1 into a signal sampled with the frequency of 4×Fs1, where Fs1 is the first sampling frequency used for the digital audio signal SDA.

The reproduced and sampled digital audio signal SDA with the first sampling frequency Fs1 is over-sampled in the second over-sampling circuit 14 with the frequency of 4×Fs1, i.e., four-times multiplication of the first sampling frequency Fs1. The sampled digital audio signal SDA is further transmitted separately to the third digital processing circuit 18 and the first sampling frequency converting circuit 11. The third digital processing circuit 18 processes the digital audio signal SDA by adding or subtracting the digital voice signal SDV1 converted with the sampling frequency above, setting a ratio of the adding or subtracting, adjusting a volume, and adjusting a tone with a signal band limiting process pre-programmed with a predetermined setting. The processed digital audio signal SDA is further converted with the audio DA converter 21 into the analog audio signal SAA and output from the second speaker SP2 or the headphone HP. The first sampling frequency converting circuit 11 converts the digital audio signal SDA into a signal sampled with the frequency of 4×Fs2, where Fs2 is the second sampling frequency used for the digital voice signal SDV1.

The analog voice signal SAV2 from a voice input device like the microphone MIC is converted with the voice AD converter 20 into the digital voice signal SDV2. The second digital processing circuit 17 processes the digital voice signal SDV2, including adding or subtracting the digital audio signal SDA, setting a ratio of the adding or subtracting, and adjusting a volume. The down-sampling circuit 15 samples the digital voice signal SDV2 with a frequency of a quarter of 4×Fs2, i.e., the sampling frequency Fs2, and sends it to a circuit block (not shown) which processes modulation for a transmission.

Figure 4:
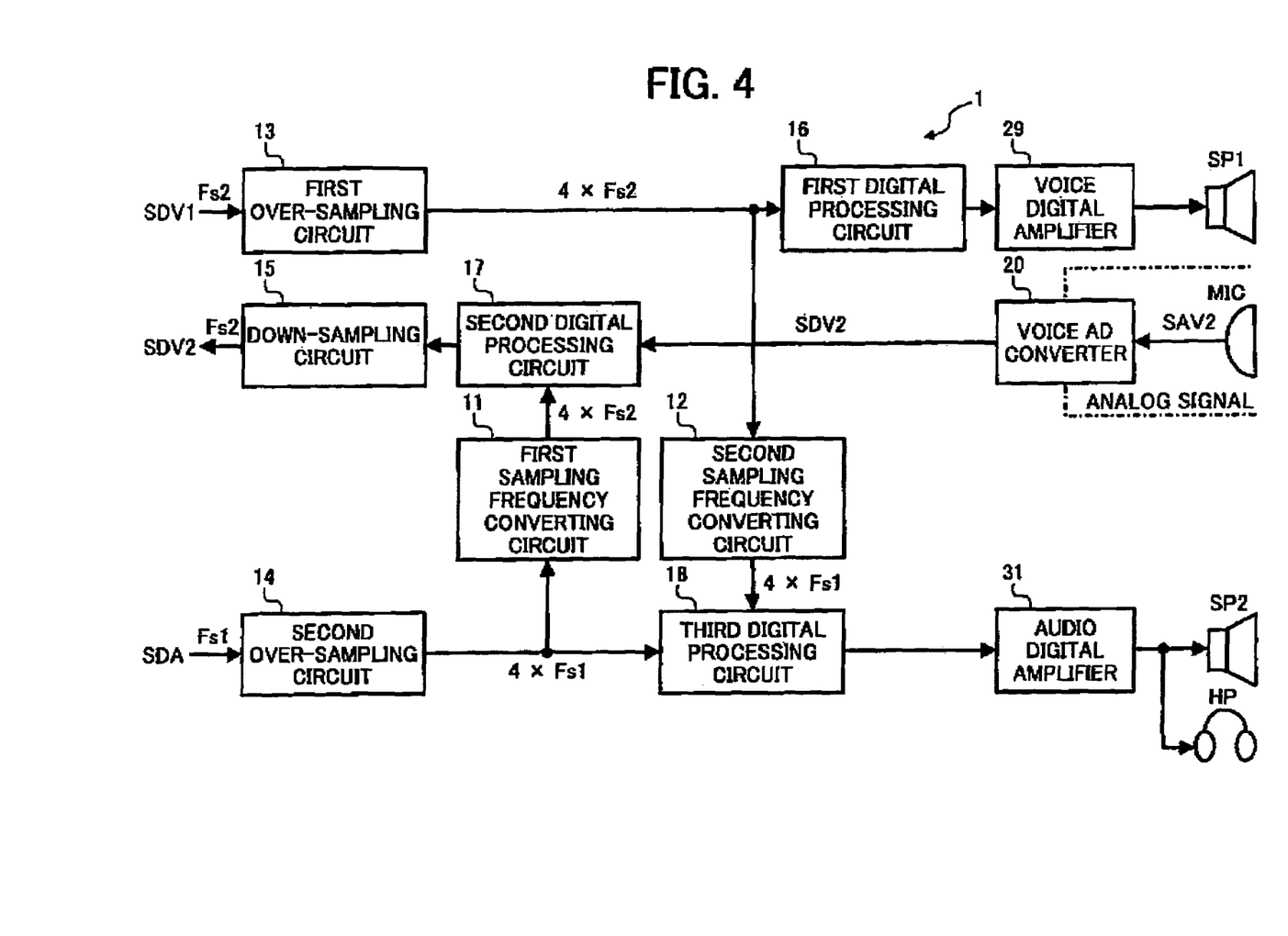
FIG. 4 is a block diagram showing a semiconductor device according to another exemplary embodiment of the present specification.

Referring to FIG. 4, another exemplary embodiment of the present specification will now be described. The audio device 1 shown in FIG. 4 includes a digital amplifier 29 and an audio digital amplifier 31, as substitutions for the voice DA converter 19 and the audio DA converter 21 shown in FIG. 2, respectively. Other components of the audio device 1 in FIG. 4 are in common with components shown in FIG. 2. A configuration is possible that integrates the following components onto one IC: the first sampling frequency converting circuit 11, the second sampling frequency converting circuit 12, the first over-sampling processing circuit 13, the second over-sampling processing circuit 14, the first digital processing circuit 16, the second digital processing circuit 17, the third digital processing circuit 18, the voice digital amplifier 29, the voice AD converter 20, and the audio digital amplifier 31.

Since signal processes performed in the audio device 1 are digitalized, digital amplifiers may replace, without any difficulty, the DA converters used in the embodiment shown in FIG. 2. Although the configuration shown in FIG. 4 still leaves a signal to remain analog in a part from the microphone MIC to the following voice AD converter C2, it allows to digitalize most processes, such as driving the voice and audio output devices, for example. Consequently, it is possible to increase efficiency of electric power due to the digital amplifiers.

As described in the above embodiments, the audio device 1 enables the addition or subtraction of the digital voice and digital audio signals by converting them with appropriate sampling frequencies. This allows digitalization of signal processing which used to be analog, thereby reducing deterioration of analog qualities caused by a variation of the process, and generation of noise caused by external noise. Furthermore, this digitalization enables downsizing of the circuit and easier transfer of the processes. It is also possible to increase efficiency of electric power of the circuit equipped with digital amplifiers.

A signal path described in the above embodiments and used in the addition or subtraction of the voice or audio signal is one example. In practical mobile phones, there exist various kinds of signal paths for the addition or subtraction according to a type of an application. It may be possible, for example, to provide a signal path for the addition or subtraction as follows. Firstly, the digital voice signal SDV is added or subtracted with the digital audio signal SDA and output to a voice output system. Secondly, the digital audio signal SDA is added or subtracted with the digital voice signal SDV2 from the voice AD converter 20, and output to an audio output system. In the above examples, the sampling frequency converting circuits of the present specification enables the adding or subtracting process to be digitalized, thereby also digitalizing signal processes in an input and output systems. Furthermore, in a case of including an additional audio AD converter for a music recording and so forth in which a signal path of the addition or subtraction may become more complex, for example, adopting the sampling frequency converting circuits of the present specification also enables signal processes to be digitalized in the input and output systems.

This specification may be conveniently implemented using a conventional general purpose digital computer programmed according to the teachings of the present specification, as will be apparent to those skilled in the computer art. Appropriate software coding can readily be prepared by skilled programmers based on the teachings of the present disclosure, as will be apparent to those skilled in the software art. The present invention may also be implemented by the preparation of application specific integrated circuits or by interconnecting an appropriate network of conventional component circuits, as will be readily apparent to those skilled in the art.

Numerous additional modifications and variations are possible in light of the above teachings. It is therefore to be understood that within the scope of the appended claims, the disclosure of this patent specification may be practiced otherwise than as specifically described herein.

This patent specification is based on Japanese patent application, No.JPAP2003-095485 filed on Mar. 31, 2003 in the Japanese Patent Office, the entire contents of which are incorporated by reference herein.

What is claimed is:

1. A semiconductor device comprising:
   a first converter configured to convert a first digital audio signal sampled with a predetermined audio sampling frequency for digital audio into a second digital audio signal sampled with a predetermined voice sampling frequency for voice signals;
   a second converter configured to convert a first digital voice signal sampled with the predetermined voice sampling frequency into a second digital voice signal sampled with the predetermined audio sampling frequency;
   a first digital processing circuit configured to perform a predetermined digital computation on the second digital audio signal sampled with the predetermined voice sampling frequency and a digital voice signal; and
   a second digital processing circuit configured to perform the predetermined digital computation on the second digital voice signal sampled with the predetermined audio sampling frequency and the first digital audio signal sampled with the predetermined audio sampling frequency.

2. The semiconductor device according to claim 1, wherein the predetermined digital computation includes an addition, a subtraction, a rate setting of the addition, and a rate setting of the subtraction.

3. The semiconductor device according to claim 1, wherein the first digital processing circuit performs a volume setting on a digital signal processed with the predetermined digital computation.

4. The semiconductor device according to claim 1, wherein the first digital processing circuit performs a signal band limitation on a digital signal processed with the predetermined digital computation.

5. The semiconductor device according to claim 4 wherein the signal band limitation is pre-programmable.

6. The semiconductor device according to claim 1, wherein the second digital processing circuit performs a volume setting on a digital signal processed with the predetermined digital computation.

7. The semiconductor device according to claim 1, wherein the second digital processing circuit performs a signal band limitation on a digital signal processed with the predetermined digital computation.

8. The semiconductor device according to claim 7, wherein the signal band limitation is pre-programmable.

9. A mobile phone using a semiconductor device, comprising:
   an input device configured to convert a voice into an analog voice signal;
   a voice analog-to-digital converter configured to convert the analog voice signal output from said input device into a first digital voice signal;
   a voice digital-to-analog converter configured to convert a second digital voice signal sampled with a predetermined voice sampling frequency for voice signals into an analog voice signal;
   a voice output device configured to generate a voice sound in accordance with the analog voice signal output from said voice digital-to-analog converter;
   an audio digital-to-analog converter configured to convert a digital audio signal sampled with a predetermined audio sampling frequency for audio signals into an analog audio signal; and
   an audio output device configured to generate an audio sound in accordance with the analog audio signal output from said audio digital-to-analog converter,
   wherein the semiconductor device is configured to process the digital voice signal, the digital voice signal sampled with the predetermined voice sampling frequency, and the digital audio signal sampled with the predetermined audio sampling frequency, and comprises:
   a first converter configured to convert the digital audio signal into a first converted signal sampled with the predetermined voice sampling frequency;
   a second converter configured to convert the digital voice signal into a second converted signal sampled with the predetermined audio sampling frequency;
   a first digital processing circuit configured to perform a predetermined digital computation on the digital audio signal sampled with the predetermined voice sampling frequency and the first digital voice signal; and
   a second digital processing circuit configured to perform the predetermined digital computation on the second digital voice signal sampled with the predetermined audio sampling frequency and the digital audio signal sampled with the predetermined audio sampling frequency.

10. The mobile phone according to claim 9, wherein the predetermined digital computation includes an addition, a subtraction, a rate setting of the addition, and a rate setting of the subtraction.

11. The mobile phone according to claim 9, wherein the first digital processing circuit performs a volume setting on a digital signal processed with the predetermined digital computation.

12. The mobile phone according to claim 9, wherein the first digital processing circuit performs a signal band limitation on a digital signal processed with the predetermined digital computation.

13. The mobile phone according to claim 12, wherein the signal band limitation is pre-programmable.

14. The mobile phone according to claim 9, wherein the second digital processing circuit performs a volume setting on a digital signal processed with the predetermined digital computation.

15. The mobile phone according to claim 9, wherein the second digital processing circuit performs a signal band limitation on a digital signal processed with the predetermined digital computation.

16. The mobile phone according to claim 15, wherein the signal band limitation is pre-programmable.

17. A mobile phone using a semiconductor device, comprising:
- an input device configured to convert a voice into an analog voice signal;
- a voice analog-to-digital converter configured to convert the analog voice signal output from said input device into a first digital voice signal;
- a digital voice amplifier configured to amplify and output a second digital voice signal sampled with a predetermined voice sampling frequency for voice signals;
- a voice output device configured to generate a voice sound in accordance with the second digital voice signal output from said digital voice amplifier;
- a digital audio amplifier configured to amplify and output a digital audio signal sampled with a predetermined audio sampling frequency for an audio signal;
- an audio output device configured to generate an audio sound in accordance with the digital audio signal output from said digital audio amplifier,
- wherein the semiconductor device is configured to process the first digital voice signal, the second digital voice signal sampled with the predetermined voice sampling frequency, and the digital audio signal sampled with the predetermined audio sampling frequency, and comprises:
  - a first converter configured to convert the digital audio signal into a signal sampled with the predetermined voice sampling frequency;
  - a second converter configured to convert the first digital voice signal into a signal sampled with the predetermined audio sampling frequency;
  - a first digital processing circuit configured to perform a predetermined digital computation on the digital audio signal sampled with the predetermined voice sampling frequency arid the digital voice signal; and
  - a second digital processing circuit configured to perform the predetermined digital computation on the first digital voice signal sampled with the predetermined audio sampling frequency and the digital audio signal sampled with the predetermined audio sampling frequency.

18. A semiconductor device comprising:
- first converting means for converting a first digital audio signal sampled with a predetermined audio sampling frequency for digital audio into a second digital audio signal sampled with a predetermined voice sampling frequency for voice signals;
- second converting means for converting a first digital voice signal sampled with the predetermined voice sampling frequency into a second digital voice signal sampled with the predetermined audio sampling frequency;
- first digital processing means for performing a predetermined digital computation on the second digital audio signal sampled with the predetermined voice sampling frequency and a third digital voice signal; and
- second digital processing means for performing the predetermined digital computation on the second digital voice signal sampled with the predetermined audio sampling frequency and the first digital audio signal sampled with the predetermined audio sampling frequency.

19. The semiconductor device according to claim 18, wherein the predetermined digital computation includes an addition, a subtraction, a rate setting of the addition, and a rate setting of the subtraction.

20. The semiconductor device according to claim 18, wherein the first digital processing means performs a volume setting on a digital signal processed with the predetermined digital computation.

21. The semiconductor device according to claim 18, wherein the first digital processing means performs a signal band limitation on a digital signal processed with the predetermined digital computation.

22. The semiconductor device according to claim 21, wherein the signal band limitation is pre-programmable.

23. The semiconductor device according to claim 18, wherein the second digital processing means performs a volume setting on a digital signal processed with the predetermined digital computation.

24. The semiconductor device according to claim 18, wherein the second digital processing means performs a signal band limitation on a digital signal processed with the predetermined digital computation.

25. The semiconductor device according to claim 21, wherein the signal band limitation is pre-programmable.

26. A mobile phone using a semiconductor device, comprising:
- input means for converting a voice into an analog voice signal;
- analog-to-digital voice converting means for convening the analog voice signal output from said input means into a first digital voice signal;
- digital-to-analog voice converting means for converting a second digital voice signal sampled with a predetermined voice sampling frequency for voice signals into an analog voice signal;
- voice output means for generating a voice sound in accordance with the analog voice signal output from said digital-to-analog voice converting means;
- digital-to-analog audio converting means for converting a digital audio signal sampled with a predetermined audio sampling frequency for audio signals into an analog audio signal; and
- audio output means for generating an audio sound in accordance with the analog audio signal output from said digital-to-analog audio converting means,
- wherein the semiconductor device is configured to process the first digital voice signal, the second digital voice signal sampled with the predetermined voice sampling frequency, and the digital audio signal sampled with the predetermined audio sampling frequency, and comprises:
  - first converting means for converting the digital audio signal into a signal sampled with the predetermined voice sampling frequency;
  - second converting means for converting the first digital voice signal into a signal sampled with the predetermined audio sampling frequency;
  - first digital processing means for performing a predetermined digital computation on the digital audio signal sampled with the predetermined voice sampling frequency and the second digital voice signal; and
  - second digital processing means for performing the predetermined digital computation on the first digital voice signal sampled with the predetermined audio sampling frequency and the digital audio signal sampled with the predetermined audio sampling frequency.

27. The mobile phone according to claim 26, wherein the predetermined digital computation includes an addition, a subtraction, a rate setting of the addition, and a rate setting of the subtraction.

28. The mobile phone according to claim 26, wherein the first digital processing means performs a volume setting on a digital signal processed with the predetermined digital computation.

29. The mobile phone according to claim 26, wherein the first digital processing means performs a signal band limitation on a digital signal processed with the predetermined digital computation.

30. The mobile phone according to claim 29, wherein the signal band limitation is pre-programmable.

31. The mobile phone according to claim 26, wherein the second digital processing means performs a volume setting on a digital signal processed with the predetermined digital computation.

32. The mobile phone according to claim 26, wherein the second digital processing means performs a signal band limitation on a digital signal processed with the predetermined digital computation.

33. The mobile phone according to claim 32, wherein the signal band limitation is pre-programmable.

34. A mobile phone using a semiconductor device, comprising:
    input means for convening a voice into an analog voice signal;
    analog-to-digital voice convening means for converting the analog voice signal output from said input means into a first digital voice signal;
    digital voice amplifying means for amplifying and outputting a second digital voice signal sampled with a predetermined voice sampling frequency for voice signals;
    voice output means for generating a voice sound in accordance with the second digital voice signal output from said digital voice amplifying means;
    digital audio amplifying means for amplifying and outputting a digital audio signal sampled with a predetermined audio sampling frequency for audio signals;
    audio output means for generating an audio sound in accordance with the digital audio signal output from said digital audio amplifying means,
    wherein the semiconductor device is configured to process the first digital voice signal, the second digital voice signal sampled with the predetermined voice sampling frequency, and the digital audio signal sampled with the predetermined audio sampling frequency, and comprises:
    first converting means for convening the digital audio signal into a signal sampled with the predetermined voice sampling frequency;
    second converting means for convening the first digital voice signal into a signal sampled with the predetermined audio sampling frequency;
    first digital processing means for performing a predetermined digital computation on the digital audio signal sampled with the predetermined voice sampling frequency and the second digital voice signal; and
    second digital processing means for performing the predetermined digital computation on the first digital voice signal sampled with the predetermined audio sampling frequency and the digital audio signal sampled with the predetermined audio sampling frequency.

35. A method of providing a semiconductor device comprising the steps of:
    first converting a first digital audio signal sampled with a predetermined audio sampling frequency for digital audio into a second digital audio signal sampled with a predetermined voice sampling frequency for voice signals;
    second converting a first digital voice signal sampled with the predetermined voice sampling frequency into a second digital voice signal sampled with the predetermined audio sampling frequency;
    first digital processing of the second digital audio signal sampled with the predetermined voice sampling frequency and a third digital voice signal with a predetermined digital computation; and
    second digital processing of the second digital voice signal sampled with the predetermined audio sampling frequency and the first digital audio signal sampled with the predetermined audio sampling frequency with the predetermined digital computation.

36. The method according to claim 35, wherein the predetermined digital computation includes an addition, a subtraction, a rate setting of the addition, and a rate setting of the subtraction.

37. The method according to claim 35, wherein the first digital processing further comprises the step of setting volume to a digital signal processed with the predetermined digital computation.

38. The method according to claim 35, wherein the first digital processing further comprises the step of limiting a signal band of a digital signal processed with the predetermined digital computation.

39. The method according to claim 38, wherein the limiting step is pre-programmable.

40. The method according to claim 35, wherein the second digital processing further comprises the step of setting volume of a digital signal processed with the predetermined digital computation.

41. The method according to claim 35, wherein the second digital processing further comprises the step of limiting a signal band of a digital signal processed with the predetermined digital computation.

42. The method according to claim 41, wherein the limiting step is pre-programmable.

43. A method of mobile telecommunication using a semiconductor device, comprising the steps of:
    first converting a voice input into a first analog voice signal;
    second converting the first analog voice signal output from said converting step into a first digital voice signal;
    third converting a second digital voice signal sampled with a predetermined voice sampling frequency for voice signals into a second analog voice signal;
    first generating a voice sound in accordance with the second analog voice signal output from said third converting step;
    fourth converting a first digital audio signal sampled with a predetermined audio sampling frequency for audio signals into an analog audio signal; and
    second generating an audio sound in accordance with the analog audio signal output from said fourth converting step,
    wherein the semiconductor device is configured to process the first digital voice signal, the second digital voice signal sampled with the predetermined voice sampling frequency, and the first digital audio signal sampled with the predetermined audio sampling frequency, and comprises the steps of:

first converting the first digital audio signal into a second digital audio signal sampled with the predetermined voice sampling frequency;

second converting the first digital voice signal into a signal sampled with the predetermined audio sampling frequency;

first digital processing of the second digital audio signal sampled with the predetermined voice sampling frequency and the second digital voice signal with a predetermined digital computation; and second digital processing of the first digital voice signal sampled with the predetermined audio sampling frequency and the first digital audio signal sampled with the predetermined audio sampling frequency with the predetermined digital computation.

44. The method according to claim 43, wherein the predetermined digital computation includes an addition, a subtraction, a rate setting of the addition, and a rate setting of the subtraction.

45. The method according to claim 43, wherein the first digital processing step further comprises the step of setting a volume of a digital signal processed with the predetermined digital computation.

46. The method according to claim 43, wherein the first digital processing further comprises the step of limiting a signal band of a digital signal processed with the predetermined digital computation.

47. The method according to claim 46, wherein the limiting step is pre-programmable.

48. The method according to claim 43, wherein the second digital processing further comprises the step of setting a volume of a digital signal processed with the predetermined digital computation.

49. The method according to claim 43, wherein the second digital processing further comprises the step of limiting a signal band of a digital signal processed with the predetermined digital computation.

50. The method according to claim 49, wherein the limiting step is pre-programmable.

51. A method of mobile telecommunication using a semiconductor device, comprising the steps of:

first converting a voice input into an analog voice signal;

second converting the analog voice signal output from said converting step into a first digital voice signal;

first amplifying to output a second digital voice signal sampled with a predetermined voice sampling frequency for voice signals;

first generating a voice sound in accordance with the second digital voice signal output from said first amplifying step;

second amplifying to output a first digital audio signal sampled with a predetermined audio sampling frequency for audio signals;

second generating an audio sound in accordance with the first digital audio signal output from said second amplifying step, wherein the semiconductor device is configured to process the first digital voice signal, the second digital voice signal sampled with the predetermined voice sampling frequency, and the first digital audio signal sampled with the predetermined audio sampling frequency, and comprising the steps of:

first converting the first digital audio signal into a second digital audio signal sampled with the predetermined voice sampling frequency;

second converting the first digital voice signal into a signal sampled with the predetermined audio sampling frequency;

first digital processing of the second digital audio signal sampled with the predetermined voice sampling frequency and the second digital voice signal with a predetermined digital computation and second digital processing of the first digital voice signal sampled with the predetermined audio sampling frequency and the first digital audio signal sampled with the predetermined audio sampling frequency with the predetermined digital computation.

\* \* \* \* \*